United States Patent [19]
Mao

[11] Patent Number: 6,119,227
[45] Date of Patent: Sep. 12, 2000

[54] METHODS AND APPARATUS FOR AUTHENTICATING AN ORIGINATOR OF A MESSAGE

[75] Inventor: Wenbo Mao, Bradley Stoke, United Kingdom

[73] Assignee: Hewlett-Packard Company, Palo Alto, Calif.

[21] Appl. No.: 08/930,217

[22] PCT Filed: Apr. 17, 1996

[86] PCT No.: PCT/GB96/00915

§ 371 Date: Oct. 20, 1997

§ 102(e) Date: Oct. 20, 1997

[87] PCT Pub. No.: WO96/33568

PCT Pub. Date: Oct. 24, 1996

[30] Foreign Application Priority Data

Apr. 18, 1995 [GB] United Kingdom .................. 9507885

[51] Int. Cl.[7] ............................................. H04L 9/00
[52] U.S. Cl. ........................ 713/171; 380/283; 380/278; 713/200; 713/202
[58] Field of Search ........................ 380/24, 23, 25, 380/277, 278, 279, 283, 284; 713/168, 171, 200

[56] References Cited

U.S. PATENT DOCUMENTS

| | | |
|---|---|---|
| 4,200,770 | 4/1980 | Hellman et al. . |
| 4,947,430 | 8/1990 | Chaum . |
| 4,949,380 | 8/1990 | Chaum . |
| 4,991,210 | 2/1991 | Chaum . |
| 4,993,069 | 2/1991 | Matyas et al. ............................ 380/23 |
| 4,996,711 | 2/1991 | Chaum . |
| 5,241,599 | 8/1993 | Bellovin et al. ......................... 713/171 |
| 5,301,247 | 4/1994 | Rasmussen et al. ...................... 380/43 |
| 5,323,146 | 6/1994 | Glaschick ............................ 340/825.34 |
| 5,373,558 | 12/1994 | Chaum . |
| 5,491,749 | 2/1996 | Rogaway ............................... 713/171 |
| 5,491,752 | 2/1996 | Kaufman et al. .......................... 380/30 |
| 5,706,349 | 1/1998 | Aditham et al. ........................ 713/159 |
| 5,706,427 | 1/1998 | Tabuki ................................... 713/201 |
| 5,720,034 | 2/1998 | Case ...................................... 380/283 |
| 5,737,422 | 4/1998 | Billings .................................. 713/159 |
| 5,864,667 | 1/1999 | Barkan ................................... 713/201 |
| 5,892,828 | 4/1999 | Perlman ................................. 713/183 |
| 5,987,130 | 11/1999 | Chang .................................... 380/283 |
| 5,995,624 | 11/1999 | Fielder et al. .......................... 713/169 |
| 6,023,689 | 2/2000 | Herlin et al. ............................. 705/67 |
| 6,052,469 | 4/2000 | Johnson et al. ......................... 380/286 |

FOREIGN PATENT DOCUMENTS

| | | |
|---|---|---|
| 0482 233 A1 | 10/1990 | European Pat. Off. . |
| 0639 907 A1 | 8/1993 | European Pat. Off. . |
| 91/14980 | 10/1991 | WIPO . |
| WO 96/33568 | 10/1996 | WIPO .............................. H04L 9/32 |

OTHER PUBLICATIONS

Mao, Wenbo, "A Secure, Cheap, Scalable and Exportable/Importable Method for Internet Electronic Payments," http://www.cs.nccu.edu.tw/~jong/agent/PP/pptr.html [internet], May 1995.

Mao, "Financial Transaction Models in the Electronic World," http://www.hpl.hp.co.uk/projects/vishnu/main.html [internet], Jun. 1995.

"Financial Transaction Models in the Electronic World," Electronic-Business Project, Hewlett-Packard Laboratories, Bristol, http://www.hpl.hp.co.uk/projects/vishnu/main.html [internet], Apr. 2000.

Operating Systems Review, Jan. 1987, USA, vol. 21, No. 1, ISSN 0163-5980, pp. 8-10, XP002008756 Otway D et al: "Efficient and timely mutual authentication".

*Primary Examiner*—Tod R. Swann
*Assistant Examiner*—Steve Kabakoff

[57] ABSTRACT

Authentication by an intermediary F (e.g. a bank) of an originator C of a message (e.g. a client sending an instruction to pay a merchant M) is accomplished using a protocol which does not require the intermediary to possess passwords used by the originator C and the merchant M to protect the contents of the message. Furthermore, the protocol does not require any party to the transaction to decrypt any value previously encrypted by any other party, so a reversible encryption algorithm is not required.

14 Claims, 5 Drawing Sheets

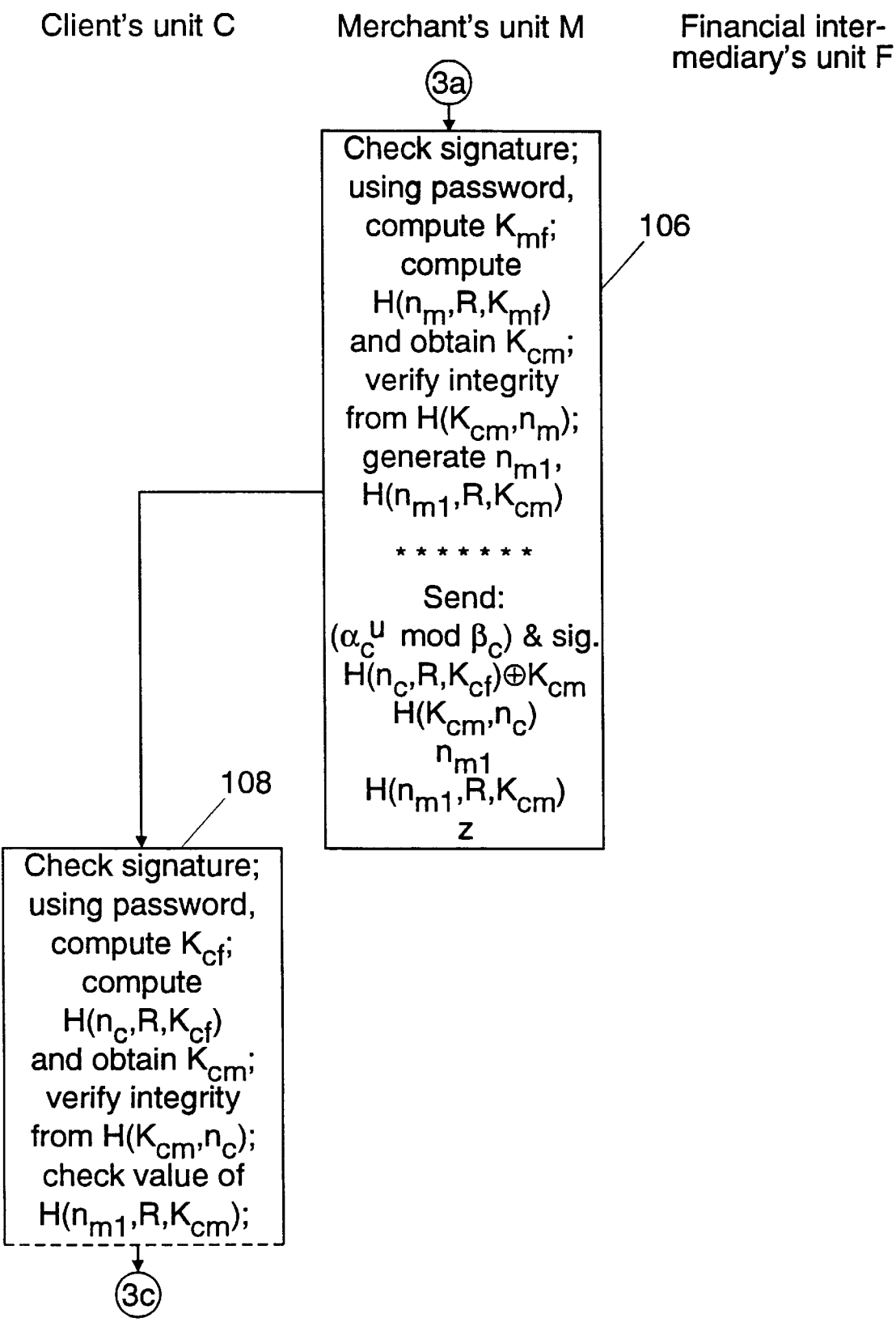

METHODS AND APPARATUS FOR AUTHENTICATING AN ORIGINATOR OF A MESSAGE

TECHNICAL FIELD

This invention relates to methods and apparatus for authenticating an originator of a message, and which in particular enable the originator of a message to be authenticated without the need for specialized authentication organizations, and without decryption of encrypted information.

BACKGROUND ART

Modern computing and telecommunication systems have enabled a rapid and continuing increase in exchange of information between individuals and organizations, e.g. via the system commonly known as the Internet. However, the full potential of such systems is currently restricted by the difficulty of providing secure transfer of valuable information over the system. Many organizations would like to use publically-accessible networks for conducting various transactions, such as the sale of goods and services. In principle payment for such transactions could be obtained from a customer by transfer over the network of relevant information such as credit card details. However it is clearly possible for a dishonest third party to intercept such information during transmission, and then mis-use it to the third party's financial advantage. Various other fraudulent activities are possible, such as false repudiation of orders. Accordingly most transactions which may be initiated over a network still have to be completed using conventional methods such as exchange of paper invoices and payments or voice messages, using more trusted systems such as mail or voice telephone networks.

It is essential for an effective electronic transaction mechanism to have several properties:

authentication (i.e. confirmation of origin) of messages involved in a transaction;
protection of the integrity of messages involved in the transaction, and ability to prove if a message has been corrupted;
prevention of false repudiation of an agreement to make a payment;
prevention of frauds involving recording and replaying of messages involved in a transaction;
economy of implementation; and
compatibility with national security interests.

Various proposals have been made for electronic message authentication. Although they tend to satisfy the primarily technical requirements, they also tend to be either costly and/or contrary to national security interests. Thus many proposals involve reliance on a specialized third-party security service, for example for authentication of messages in each transaction or to supply and certify public encryption keys. In addition many of these proposals involve the use of reversible encryption algorithms, i.e. algorithms in which information is concealed by encryption by a sender and retrieved again by decryption by the recipient. Such algorithms can also be used for transfer of other information which is contrary to national security interests, so the distribution and in particular export from some countries of products which incorporate reversible encryption algorithms is often controlled or prohibited. Any proposal which involves decryption, and thus requires a reversible encryption algorithm, is unlikely to be suitable to be made available for use on a widespread basis.

It is an object of this invention to provide a method and apparatus for authenticating messages which avoids the problems entailed in prior proposals, and in particular does not require any specialist security service nor involve the use of a reversible encryption technique.

Disclosure of Invention

According to one aspect of this invention there is provided a method for enabling authentication of an originator of a message, using a composite one-way function which enables a protected version of an input value to be derived by applying successively in either order two component one-way functions using two respective values, but which does not enable the input value to be readily determined from the protected version in combination with either of said values individually, comprising the steps of:

a) receiving a protected version of a password, said protected version being derived from a first of said component one-way functions using said password as said respective value;
b) generating another value;
c) generating a protected version of said other value by applying a second of said component one-way functions;
d) generating a digital signature for the protected version of said other value;
e) applying said second component one-way function using said other value to said protected password to derive a ticket key;
f) generating a session key;
g) protecting said session key with said ticket key;
h) supplying said protected version of said other value, said digital signature and said protected session key to the source of said protected password; and
i) thereafter destroying said other value, said ticket key and said session key.

According to one aspect of this invention there is provided apparatus for enabling authentication of an originator of a message, using a composite one-way function which enables a protected version of an input value to be derived by applying successively in either order two component one-way functions using two respective values, but which does not enable the input value to be readily determined from the protected version in combination with either of said values individually, comprising:

means for receiving a protected version of a password, said protected version being derived from a first of said component one-way functions using said password as said respective value;
means for generating another value;
means for generating a protected version of said other value by applying a second of said component one-way functions;
means for generating a digital signature for the protected version of said other value;
means for applying said second component one-way function using said other value to said protected password to derive a ticket key;
means for generating a session key;
means for protecting said session key with said ticket key;
means for supplying said protected version of said other value, said digital signature and said protected session key to the source of said protected password.

BRIEF DESCRIPTION OF DRAWINGS

Methods and apparatus for authenticating an originator of a message in accordance with this invention without the use of a reversible encryption algorithm will now be described, by way of example, with reference to the accompanying drawings, in which:

FIGS. 3a–c show successive stages of the protocol.

BEST MODE FOR CARRYING OUT THE INVENTION, & INDUSTRIAL APPLICABILITY

Figure 1:
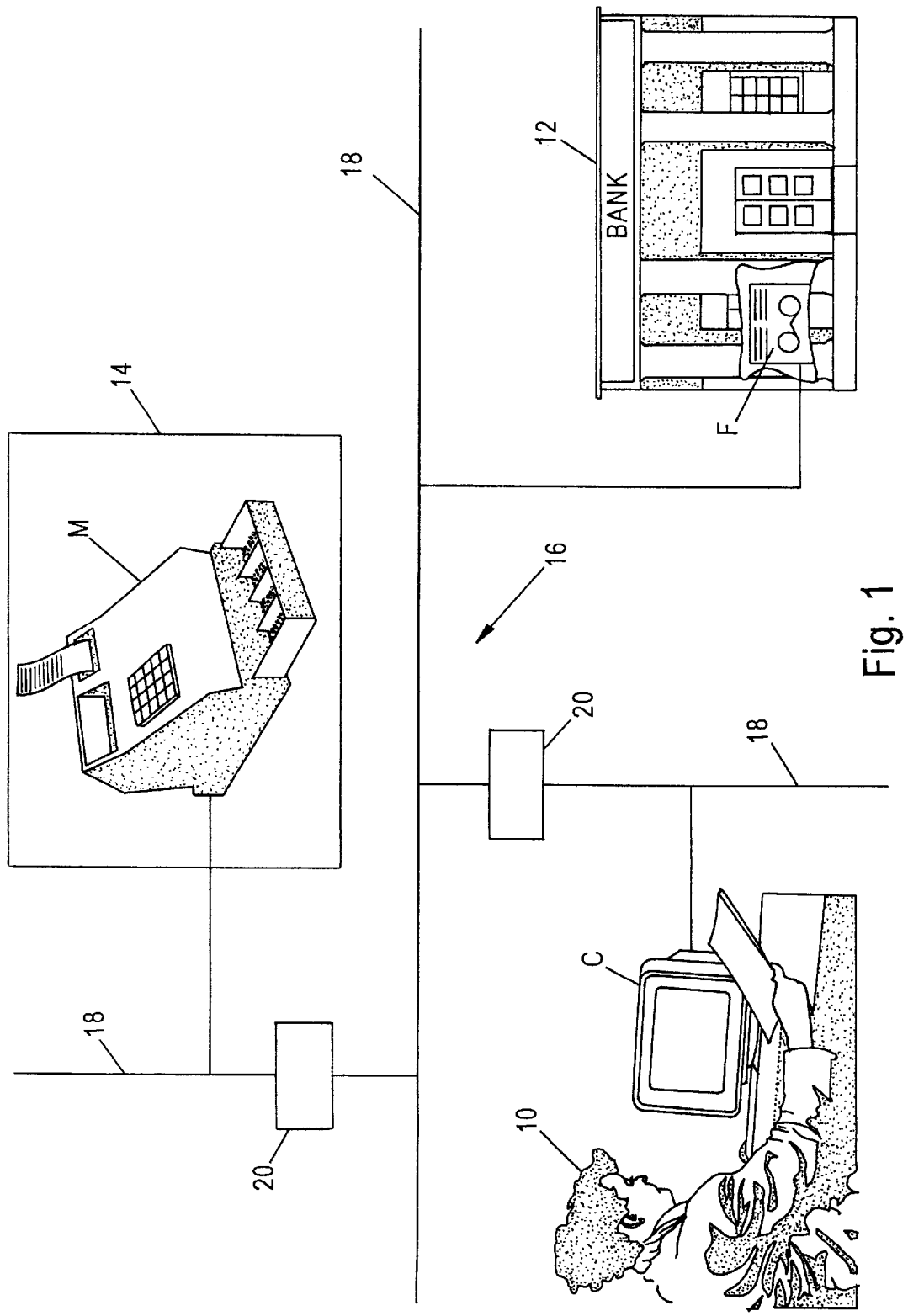
FIG. 1 illustrates a transaction in which authentication of messages is necessary.

Referring to FIG. 1, the invention will be described by reference to the example of a client 10 who wishes to instruct a financial intermediary 12 (such as a bank or credit card company) to make a payment to the account of a merchant 14. Each of these parties possesses a protocol unit C, F and M respectively, comprising for example appropriately-programmed computers (as in the case of the client 10 and the financial intermediary 12) or special-purpose hardware devices (as in the case of the merchant 14). These units are coupled to a communication system 16 which comprises multiple computer networks 18 interconnected by routers 20 and which typically serves many tens of thousands of users. The networks 18 are of the kind in which at least some units attached to one network 18 can monitor messages travelling over that network between other units on the same or other networks 18. Accordingly it is not safe to transfer information such as financial transaction details in clear form over the system 16 in view of the risk of interception and misuse of that information by other parties. Furthermore, the large number of people and organizations connected to the system 16 means that for any given transaction the parties involved may never have previously had any contact. Accordingly they do not necessarily have any established relationship by means of which they might confirm each other's identity and trustworthiness. Even if such a relationship does exist there remains the risk of a fraudster masquerading as one of the parties in order to defraud the other.

The present invention provides a protocol by which the parties to a transaction, for example, can authenticate messages (i.e. confirm the origin of the messages) involved in the transaction. The method does not require the parties to share any information which one party must encode and the other must decode, for example to confirm identity; thus there is no need for a reversible encryption algorithm to be used. Although the method does entail the participation of a trusted intermediary, many existing transactions typically involve the participation of such an intermediary in the form of a financial institution, in which trust is placed, so this requirement should not normally constitute an obstacle. Furthermore the intermediary does not have to hold secret information belonging to either party.

The protocol involves the use of an arithmetic operation known as modular exponentiation, in which a first number $\alpha$ is raised to some power p, and this value is divided by a second number $\beta$; the desired result q is the remainder of the division operation:

$$q = \alpha^p \bmod \beta \tag{1}$$

Modular exponentiation is a one-way function, in that although the operation of equation (1) is straightforward to perform, the inverse operation, i.e. determination of p given $\alpha$, $\beta$ and q, can be made extremely hard by appropriate choice of the values of $\alpha$ and $\beta$. $\beta$ is chosen to satisfy the condition $$\beta = 2i + 1 \tag{2}$$

where i is a prime number. $\alpha$ is typically chosen to be a value which is a 'generator modulo $\beta$', meaning that the value of $(\alpha^p \bmod \beta)$ varies through all values between 1 and $\beta-1$ as p varies between 1 and $\beta-1$. Pairs of values $\alpha$, $\beta$ can be selected so that $\beta$ conforms to equation (2), for example using the method described in *Applied Cryptography* by B. Schneier, John Wiley & Sons, 1994, pp. 208–9.

Figure 2:
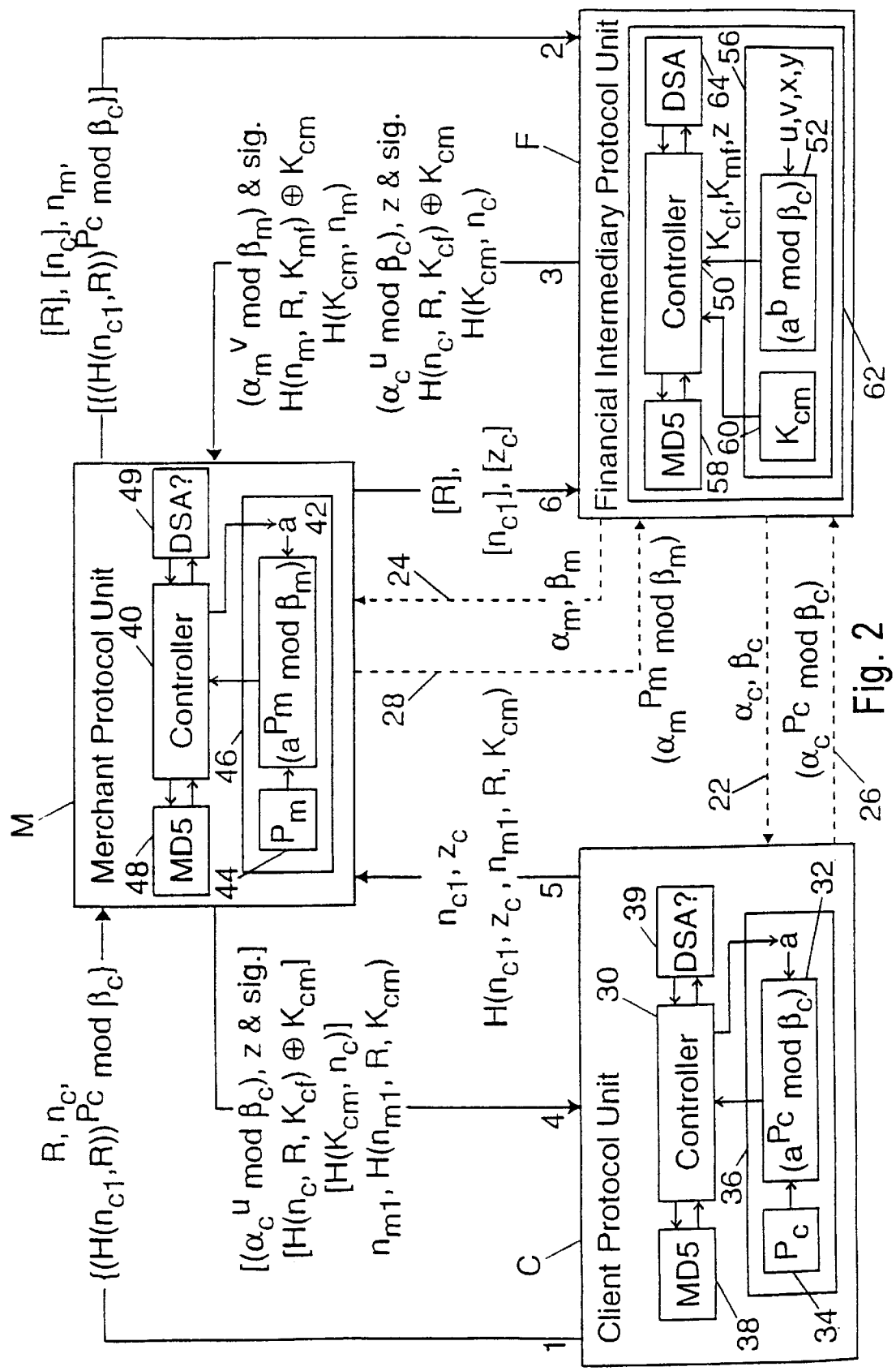
FIG. 2 is a block schematic diagram showing the transfer of messages in a protocol by which a trusted intermediary F enables two parties C and M to authenticate each other, and verifies that C has authorized a transaction.

Referring to FIG. 2, it is first necessary for the client 10 and the merchant 14 to select respective passwords $P_c$ and $P_m$, and for these to be notified in encoded form to the financial intermediary 12 once only prior to the first transaction. To this end the financial intermediary's protocol unit F selects pairs of numbers $\alpha_c$, $\beta_c$ and $\alpha_m$, $\beta_m$ as described above, stores them for future use as described below, and informs the client's protocol unit C and the merchant's protocol unit M respectively of the values of these pairs, as indicated by dashed lines 22 and 24. No particular secrecy or security is required for this step. Thus the values may be sent in printed form by mail, and entered into the protocol units via a keyboard, magnetic stripe card or the like. The client 10 selects a password (e.g. an easily memorized word, number, etc.) and enters this into the protocol unit C as well. The unit C manipulates this password in a predetermined manner to convert it to purely digital form if necessary and ensure the resulting value $P_c$ is in one of the ranges [3, i−1] and [i+1, $\beta_c-2$], where i satisfies the relation $\beta_c = 2i+1$, so that the value of $P_c$ is relatively prime to $\beta_c - 1$. The digital password $P_c$ is then encoded by hashing it using equation (1) and the numbers $\alpha_c$, $\beta_c$ supplied by the financial intermediary 12

$$E_{P_c} = \alpha_c^{P_c} \bmod \beta_c \tag{3}$$

If desired, to decrease vulnerability to guessing etc. of the client's selected password by another person, the digital password $P_c$ may be concatenated with a random 'salt' value s before encoding, as described in *Unix operating system security* by F. T. Grampp and R. H. Morris, AT&T Bell Laboratories Technical Journal, 63, October 1984. In this case the encoding operation is $$E_{P_c} = \alpha_c^{sP_c} \bmod \beta_c \tag{3a}$$

The encoded value $E_{P_c}$ is communicated to the financial intermediary 12 by the client's protocol unit C, as indicated by dashed line 26, taking reasonable precautions to verify the association of the value of $E_{P_c}$ with the client.

In order to implement and coordinate these functions the client's protocol unit C includes a controller 30 coupled to an exponentiation unit 32, and a module 34 for deriving the digital password $P_c$ from the client's password and for supplying it to the exponentiation unit. This unit is arranged to perform the calculation $$\alpha^{P_c} \bmod \beta_c \tag{4}$$

on any value $\alpha$, including $\alpha_c$, supplied to it by the controller 30, and to furnish the result of this calculation to the controller. For security purposes the storage module 34 and the exponentiation unit 32 are designed never to output the value of the password $P_c$ directly, as indicated schematically by the enclosure 36 around them. The values $\alpha_c$, $\beta_c$ and s (if used) may be concatenated for storage purposes to make misuse by another person of the values as stored more difficult.

The merchant likewise selects a password and enters it into the protocol unit M (for example using a smart card which is accessible to the merchant's staff). The unit M derives a corresponding digital password $P_m$, encodes it using the numbers $\alpha_m$, $\beta_m$ according to the relation $$E_{Pm} = \alpha_m^{Pm} \bmod \beta_m \quad (5)$$

and communicates the value $E_{Pm}$ to the financial intermediary 12 in confidence, as indicated by the dashed line 28. The merchant's protocol unit includes a controller 40, exponentiation unit 42, storage module 44 and enclosure 46 corresponding to the items 30 to 36 in the client's unit C.

Figure 3A:
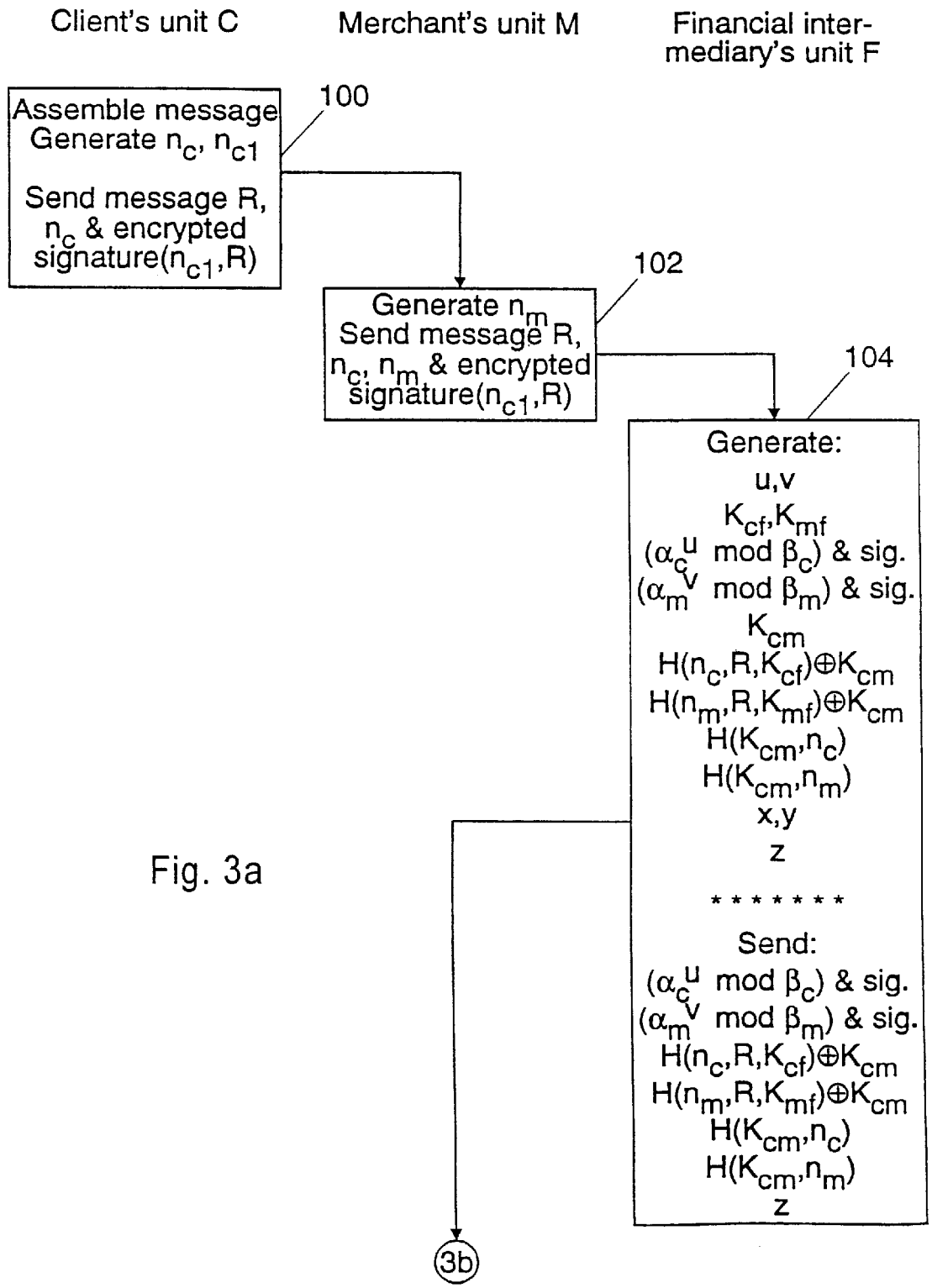
Figure 3C:
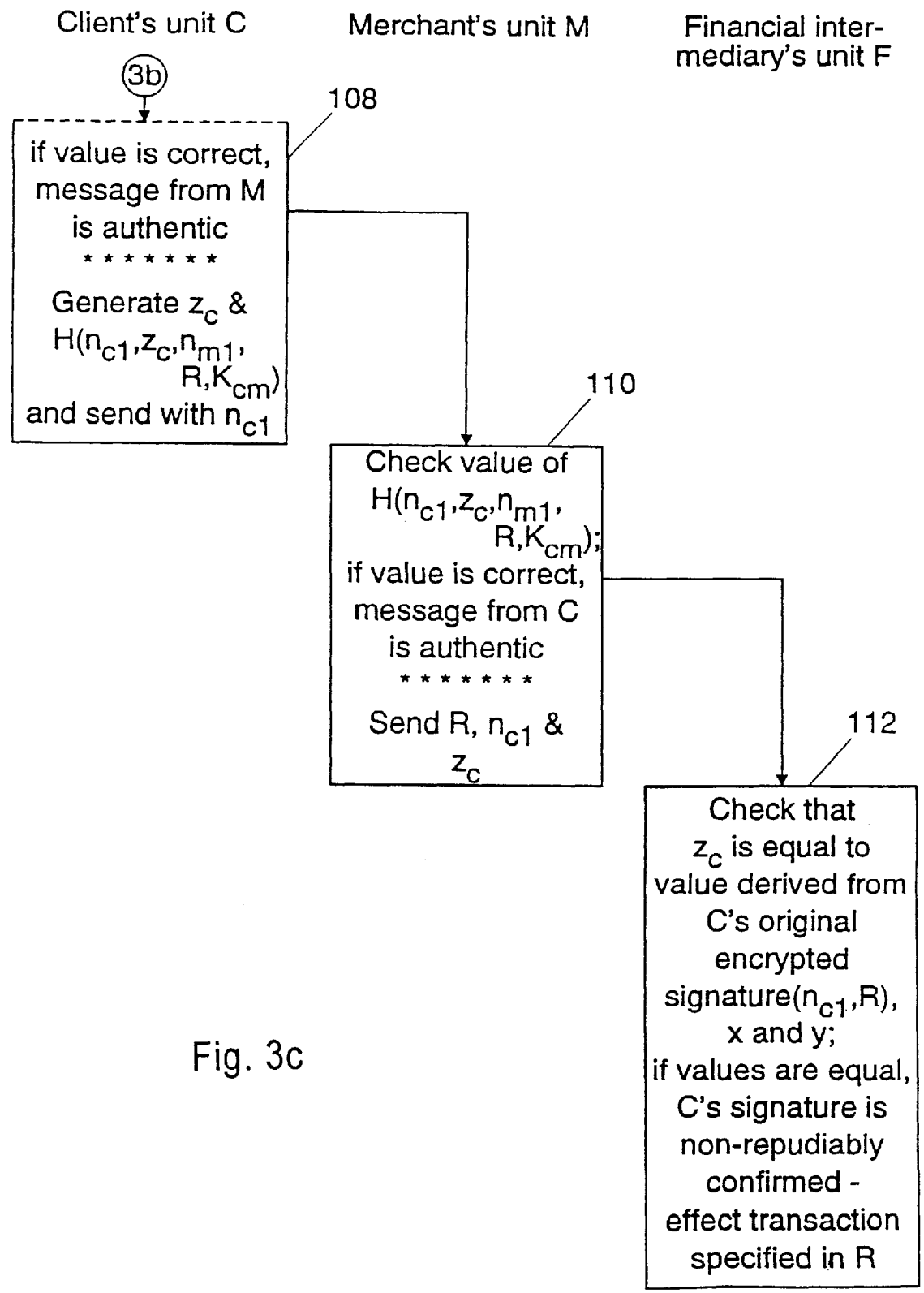

Referring to FIGS. 3a to 3c, in a first stage 100 of the protocol, the client 10 composes an appropriate message, such as "transfer five hundred dollars from my account no. 1234 5678 9876 to M's account no. 9876 5432 1234" and enters it into her protocol unit C. As a preliminary step to deriving a digital signature which incorporates the client's password $P_c$ and which will accompany this message, the controller 30 in the unit C then generates two numbers $n_c$, $n_{cl}$; the values of these numbers may or may not be selected essentially at random (although with the restriction noted below in the case of $n_{cl}$), but the controller 30 is arranged to ensure that each value used is chosen afresh, for each transaction, in a manner which makes it unlikely that anyone else can predict the value chosen and unlikely that the same value will be chosen for two different transactions. As they are used on a single occasion the numbers $n_c$, $n_{cl}$ are referred to as 'nonces'.

The controller 30 concatenates the nonce $n_{cl}$ with a digital representation R of the characters comprising the client's message, and encodes the resulting sequence of digits using a one-way hashing function (such as the MD5 function described in *The MD5 message digest algorithm* by R. L. Rivest, Internet RFC 1321, April 1992) to produce a fixed-length sequence of digits represented herein as $H(n_{cl}, R)$, where H is the hashing function. The unit C includes an MD5 encoder 38 coupled to the controller 30 for effecting this hashing function. The value of $n_{cl}$ is selected by the controller 30 so that $H(n_{cl}, R)$ is a generator modulo $\beta_c$, in the same manner as described above in respect of the number $\alpha$. Selection of $n_{cl}$ in this way makes it hard to discover the value of $H(n_{cl}, R)$ from the password-protected version (described below) which will actually be transmitted. The use of the hashing function H has the effect of compressing the size of the digital value involved, thereby facilitating subsequent calculations, and itself makes decoding computationally infeasible. The values of $n_{cl}$ and thus of $H(n_{cl}, R)$ play a significant role in the final verification of the client's digital signature, so it is important that they are protected at this stage.

The hashed value $H(n_{cl}, R)$ is itself password-protected by the controller 30 by supplying it as the input value $\alpha$ to the exponentiation unit 32, in order to derive the client's digital signature for the message R according to the relation:

$$S_c = \{(H(n_{cl}, R))^{Pc} \bmod \beta_c\} \quad (6)$$

The protocol unit C then sends the message R, the nonce $n_c$ and the signature $S_c$ to the merchant's protocol unit M through the communication system 16, as indicated in FIG. 2 by the message transfer labelled 1.

In the next stage 102 (FIG. 3a) of the protocol, the controller 40 in the protocol unit M itself selects a nonce $n_m$ for this transaction, and forwards it to the financial intermediary's protocol unit F, together with the message R, the nonce $n_c$ and the signature $S_c$ received from the protocol unit C. This is indicated in FIG. 2 by the message transfer labelled 2; the items R, $n_c$ and the signature $S_c$ are enclosed in square brackets [ ] to indicate that these values are not generated or re-calculated by the protocol unit M, but are simply forwarded as received.

When these items are received by the protocol unit F, it undertakes a series of steps comprising stage 104 (FIG. 3a) of the protocol. To this end the protocol unit F includes a controller 50 coupled to an exponentiation unit 52 in a secure enclosure 56 in similar manner to the client's unit C. The secure enclosure 56 also contains a session key generator 60 for producing random number keys and supplying them to the controller 50; since the security of these session keys is important, the controller 50 itself is located in a secure enclosure 62. This enclosure 62 also contains an MD5 encoder 58 corresponding to the encoder 38 in the client's unit C.

The steps performed in stage 104 are as follows:

(i) Generate two nonces u and v for use once only for this purpose, in the ranges

[3, i−1] and [i+1, $\beta_c$−2] for u

[3, j−1] and [j+1, $\beta_m$−2] for v where i satisfies the relation $\beta_c = 2i+1$ and j satisfies the relation $\beta_m = 2j+1$.

(ii) Compute two keys, again for use once only for the present transaction, one key $K_{cf}$ being used by the client's unit C and the financial intermediary's unit F, and the other key $K_{mf}$ being used by the merchant's unit M and the financial intermediary's unit F; these keys are derived by the controller 50 according to the relations:

$$K_{cf} = (E_{Pc})^u \bmod \beta_c \quad (7)$$

$$K_{mf} = (E_{Pm})^v \bmod \beta_m \quad (8)$$

It should be noted that the right-hand side of equation 7 can be expanded into the form $$(\alpha_c^{Pc} \bmod \beta_c)^u \bmod \beta_c \quad (9)$$

and that, because modular exponentiation is commutative $$K_{cf} = (\alpha_c^{Pc} \bmod \beta_c)^u \bmod \beta_c = (\alpha_c^u \bmod \beta_c)^{Pc} \bmod \beta_c \quad (10)$$

Thus if the client's protocol unit C is provided with the value $E_u = (\alpha_c^u \bmod \beta_c)$, which can be readily done without risking revealing the value of u, then the controller 30 can set $\alpha$ equal to this value $E_u$ and compute the value of the key $K_{cf}$ using formula (4) above. Equation (10) in effect defines a composite one-way function, comprising a first component one-way function ($\alpha_c^{Pc} \bmod \beta_c$) using the password $P_c$, and a second component one-way function $((E_{Pc})^u \bmod \beta_c)$ using the value u. The merchant's protocol unit M can likewise compute the value of the key $K_{mf}$ from the formula $(E_v)^{Pm} \bmod \beta_m$ where $E_v = (\alpha_m^v \bmod \beta_m)$.

(iii) Compute the values $E_u$, and $E_v$, using the number pairs $\alpha_c$, $\beta_c$ and $\alpha_m$, $\beta_m$, which the unit F originally selected, and the values u and v generated at step (i).

(iv) Obtain a random number from the session key generator 60 for use as a session key $K_{cm}$ which will be made known to both the client's protocol unit C and the merchant's unit M, and communicated by each unit to the other to verify the sending unit's identity. To protect the session key itself, the controller 50 generates two encoding keys, one for the unit C and one for the unit M, using the hashing function provided by MD5 encoder 58, and combines the session key with these keys to produce two tickets by a bitwise exclusive-OR (XOR) operation, represented by $\oplus$ in the following relationships:

ticket for $C = H(n_c, R, K_{cf}) \oplus K_{cm}$ (11)

ticket for $M = H(n_m, R, K_{mf}) \oplus K_{cm}$ (12)

(v) To enable the integrity of these tickets to be verified by their respective recipients, generate respective verifiers $H(K_{cm}, n_c)$ and $H(K_{cm}, n_m)$, again using the hashing function provided by the MD5 encoder 58.

(vi) In preparation for verifying the client's digital signature $S_C$ which will subsequently be forwarded by the merchant's protocol unit M, generate two more random numbers x and y, both in the ranges [3, i−1] and [i+1, $\beta_c$−2], and use them to compute a value z according to the relationship:

$$z = \{((S_C)^x \bmod \beta_c)((E_{Pc})^y \bmod \beta_c)\} \quad (13)$$

(vii) Compute two digital signatures: one signature $S_{FC}$ for the concatenation of the values $E_u$ and z; and a second signature $S_{Fm}$ for the value $E_v$. These signatures are produced by using, for example, the Digital Signature Algorithm (DSA) defined in *Proposed Federal Information Processing Standard for Digital Signature Standard* (DSS), Federal Register, v. 56, no. 169, Aug. 30, 1991, pp. 42980–42982, to enable the values of $E_u$, z and $E_v$ to be authenticated upon reception. For this purpose the unit F includes a DSA encoder 64 located within the enclosure 62 and connected to the controller 50.

To conclude stage 104, the protocol unit F sends the following items back to the merchant's protocol unit M:

$E_u$, z and $S_{FC}$ for the client's unit C;

$E_v$ and $S_{FM}$ for the merchant's unit M;

the ticket $H(n_c, R, K_{cf}) \oplus K_{cm}$ for C;

the ticket $H(n_m, R, K_{mf}) \oplus K_{cm}$ for M;

the verifiers $H(K_{cm}, n_c)$ and $H(K_{cm}, n_m)$.

This communication is indicated in FIG. 2 by the message transfer labelled 3.

Upon receipt of these items the merchant's protocol unit M commences stage 106 of the protocol (FIG. 3b). First the controller 40 in this unit checks the received value $E_v$ by using the associated DSA signature $S_{Fm}$; for this purpose the unit M includes a DSA verifier 49. Next the controller derives the value of the key $K_{mf}$ using the merchant's password $P_m$ in the formula $(E_v)^{Pm} \bmod \beta_m$. With the key $K_{mf}$, the digital message R received from the client C and the nonce $n_m$ it generated at stage 102, the controller 40 can now use the MD5 encoder 48 to obtain the hashed value $H(n_m, R, K_{mf})$. By using an exclusive-OR operation of this value with the ticket $H(n_m, R, K_{mf}) \oplus K_{cm}$ defined in equation (12), the controller 40 can determine the session key $K_{cm}$. The integrity of this session key is verified by obtaining the hashed value $H(K_{cm}, n_m)$, using the MD5 encoder 48 again, and comparing it with the corresponding hashed value sent by the protocol unit F. The inclusion of the nonce $n_m$ in this check confirms that the session key $K_{cm}$ has been freshly generated.

If these checks are satisfactory, the controller 40 proceeds to generate a second nonce $n_{ml}$ for the merchant's unit M, and then obtains a new hashed value $H(n_{ml}, R, K_{cm})$ from the MD5 encoder 48, for use in demonstrating to the client's unit C the authenticity of the next communication it receives from merchant's unit M.

For this next communication, indicated by the message transfer labelled 4 in FIG. 2, the unit M sends the following items to the unit C:

$E_u$, z and $S_{FC}$ (as received from the unit F);

the ticket $H(n_c, R, K_{cf}) \oplus K_{cm}$ (as received from the unit F);

the verifier $H(K_{cm}, n_c)$ (as received from the unit F);

the nonce $n_{ml}$ and the new hashed value $H(n_{ml}, R, K_{cm})$.

In the next stage 108 of the protocol, the controller 30 in the unit C performs several steps analogous to those just performed in the unit M: it checks the received value $E_u$ by using the associated DSA signature $S_{FC}$, for which purpose it includes a DSA verifier 39. Next the controller 30 derives the value of the key $K_{cf}$ using the client's password $P_c$ and with α set to the value $E_u$ in formula (4) above. With the key $K_{cf}$, the digital message R and the nonce $n_c$ it generated, the controller 30 can now use the MD5 encoder 38 to obtain the hashed value $H(n_c, R, K_{cf})$. By using an exclusive-OR operation of this value with the ticket $H(n_c, R, K_{cf}) \oplus K_{cm}$ defined in equation (11), the controller 30 can determine the session key $K_{cm}$. The integrity of this session key is verified by obtaining the hashed value $H(K_{cm}, n_c)$, using the MD5 encoder 38 again, and comparing it with the corresponding hashed value sent by the protocol unit F via the merchant's unit M. The inclusion of the nonce $n_c$ in this check confirms that the session key $K_{cm}$ has been freshly generated.

With this session key and the nonce $n_{ml}$, the controller 30 now obtains from the MD5 encoder 38 the hashed value $H(n_{ml}, R, K_{cm})$, and compares it with the hashed value received from the merchant's protocol unit M. If this comparison is successful, indicating that the merchant 14 is in possession of the session key $K_{cm}$, the authenticity of the communication from the merchant 14 has been confirmed. Accordingly the client's unit C can proceed with authorization of the transaction.

To this end, in the final part of stage 108 (FIG. 3c), the controller 30 derives the following value to enable the financial intermediary to confirm the client's signature undeniably:

$$z_c = z^{1/Pc} \bmod \beta_c \quad (14)$$

where $1/P_c$ indicates the inverse of the password $P_c$ modulo ($\beta_c$−1), derived from $P_c$ as described in *Cryptography and Data Security* by D. E. Denning, Addison-Wesley, 1982.

The controller 30 then obtains from the MD5 encoder 38 the hashed value $H(n_{cl}, Z_c, n_{ml}, R, K_{cm})$ and sends it, with the value $Z_c$ and the nonce $n_{cl}$ which was included in the digital signature $S_c$, to the merchant's protocol unit M, as indicated by the message transfer labelled 5 in FIG. 2.

At stage 110, the controller 40 in the unit M then obtains from the MD5 encoder 48 the hashed value $H(n_{cl}, z_c, n_{ml}, R, K_{cm})$ and compares it with the value received from the unit C. If the comparison is correct, indicating that the client 10 is also in possession of the session key $K_{cm}$ together with the message R, the authenticity of the communication from the client 10 has been confirmed. Accordingly the merchant's unit M forwards the client's confirmation of the digital signature $S_C$ by sending the items R, $n_{cl}$ and $Z_c$ to the protocol unit F, as indicated by the message transfer labelled 6 in FIG. 2.

In the final stage 112 of the protocol, the protocol unit F, now having the nonce $n_{cl}$, obtains the hashed value $H(n_{cl}, R)$ from the MD5 encoder 58, and verifies the client's digital signature $S_C$ by checking whether the following relationship is satisfied:

$$z_c = \{((H(n_{cl}, R))^x \bmod \beta_c)(\alpha_c^y \bmod \beta_c)\} \quad (15)$$

If this relationship is satisfied, the signature is confirmed as being genuine, and cannot be repudiated (as explained below).

This protocol establishes the following facts for the financial intermediary F: the authenticity of the client's signature; both the client's unit C and the merchant's unit M have correctly used their keys $K_{cf}$ and $K_{mf}$;

both the client's unit C and the merchant's unit M have correctly used the session key $K_{cm}$, and they each have established that the other has correctly used it (i.e. they have each authenticated the other's identity); these authentications relate to the message R; by sending the nonce $n_{cl}$ to the financial intermediary's protocol unit F, via the merchant's unit M, the client 10 has confirmed her agreement to the contents of the message R.

The protocol accomplishes these demonstrations by means of authentication performed by the trusted intermediary 12; however, it is not necessary for the intermediary F to possess the passwords $P_c$ and $P_m$ of the client 10 and the merchant 14: the relevant encryption is performed without the encryption function being directly available to the intermediary F. Furthermore, inspection of the protocol shows that nowhere is it necessary for any unit C, M or F to decrypt any value previously encrypted by any other unit. Thus there is no need to use a reversible encryption algorithm of a kind which would be subject to regulatory restrictions (typically an exclusive-OR operation is not regarded as falling into a restricted category).

In particular the protocol involves the use of two nonces (u and v), in a manner which does not require them to be communicated as such. Furthermore, the manner in which they are communicated (incorporated into the values $E_u$ and $E_v$) does not enable them to be readily discovered, and the information they protect ($K_{cf}$ and $K_{mf}$) is not communicated as such, although it can be obtained by parties properly possessing the appropriate passwords $P_c$ and $P_m$ without those parties needing to know the values u and v themselves. Digital signatures $S_{FC}$ and $S_{FM}$ are supplied with the values $E_u$ and $E_v$ to authenticate them, and are used for that purpose only. Accordingly, it is relatively easy and economical to implement a very secure, tamper-resistant device (i.e. the protocol unit F) to generate the one-time numbers u and v, compute the values $E_u$ and $E_v$ and sign them digitally with the signatures $S_{FC}$ and $S_{FM}$.

If it is necessary to prove that the digital signature $S_C$ did originate from the client 10, this can be done by requesting the client to provide the result of the formula (4) for one hundred different numbers a. Ninety-nine of these numbers are chosen to have the form ($\alpha_c^x$ mod $\beta_c$), i.e. are derived from ninety-nine values of x, so the results provided by the client 10 can be checked by performing the calculation $$((E_{P_C})^x \bmod \beta_c) \tag{16}$$

If these ninety-nine results are correct, the client 10 is shown to have used her password $P_c$ in obtaining them.

The remaining value a is derived using the formula $$(\alpha_c^b \bmod \beta_c)(H(n_{cl}, R)) \tag{17}$$

where b is selected from the ranges [3, i−1] and [i+1, $\beta_c$−2]. The result d provided by the client 10 from formula (4) is tested using the relationship $$d=[S_C((E_{P_C})^b \bmod \beta_c)] \bmod \beta_c \tag{18}$$

If this relationship is satisfied, the digital signature $S_C$ must have been produced using the client's password $P_C$.

What is claimed is:

1. A method of enabling a first party to authenticate a second party by confirming that a communication from the second party must have been derived using a password of the first party, wherein the second party does not know the password, comprising the steps:

the first party: applying a commutative one-way function to the password to form a first result, generating a first random value and providing the first result and the first random value to the second party;

the second party: generating a second random value and a session key, applying the commutative one-way function to the first result received from the first party and the second random value to calculate a second result, combining the first random value received from the first party with the second result to obtain a first hashed result, calculating a protected hashed result from the first hashed result and the session key, and applying the commutative one-way function to the second random value to form a protected second random value and providing the first party with the protected second random value and the protected hashed result;

whereby the first party can calculate: (a) the second result from the password and the protected second random value, (b) the first hashed result from the second result the first party calculates and the first random value, and (c) the session key by combining the hashed result calculated by the first party with the protected hashed result received from the second party.

2. The method of claim 1, wherein the second party also calculates from the session key and the first random value a second hashed result and provides the second hashed result to the first party, whereby the first party can verify the session key by (a) recalculating the second hashed result from the first random value and the session key and (b) comparing the recalculated second hashed result with the second hashed result received from the second party.

3. The method of claim 1, wherein the commutative one-way function is a modular exponentiation function.

4. The method of claim 1, wherein the protected hashed result provided to the first party is the result of an exclusive OR operation on the hashed result and the session key.

5. The method of claim 1, wherein the second party: (a) calculates a digitally signed version of the protected second random value, and (b) provides the digitally signed version of the protected second random value to the first party, and the first party verifies the digitally signed version of the protected second random value to authenticate the protected second random value received from the second party.

6. The method of claim 5, wherein the calculating and verifying steps of the digitally signed version of the protected second random value are performed with a digital signature algorithm.

7. The method of claim 1, wherein the first party: (a) generates a third random value, and (b) calculates a digital signature using said third random value, and (c) provides the digital signature to the second party; after the first party has calculated the second result from the password and the protected second random value, the first party provides the third random value to the second party; and the second party responds to the third random value verifying the digital signature.

8. The method of claim 1, further comprising authenticating a communication between the first party and a third party, the third party communicating with the second party in the same manner as the first party communicates with the second party, the first and second random values in the communication between the first party and the third party being independent of the first and second random values generated in the communication between the first party and the second party and the session key is the same as that generated in communication between the first party and the second party, such that the session key may be used by each of the first party and the third party to authenticate the other party.

9. The method of claim 1, wherein the first party: calculates (a) the second result from the password and the protected second random value, (b) the first hashed result from the second result the first party calculates and the first random value, and (c) the session key by combining the hashed result calculated by the first party with the protected hashed result received from the second party.

10. The method of claim 1, wherein the first and second random values are one-time random values.

11. A first device for authenticating an originator of a message from a second device by confirming that a message from the second device must have been derived using a password of the first device, the first device being arranged for sending (a) a protected version of the password and (b) a first random value to the second device, the second device being arranged for generating a second random value, the second device being arranged for using (a) and (b) received from the first device and the second random value to protect a session key, the second device being arranged for generating a protected version of the second random value, the devices being arranged so the second device can send to the first device the protected session key and the protected second random value, the first device being arranged so it can recover the session key from the protected session key received from the second device using the password of the first device and a protected second random value received from the second device, the first device comprising:

a protecting mechanism for protecting the password of the first device;

a first random value source for generating a first random value for the first device;

a transmitter for supplying the protected password and the first random value of the first device to the second device;

a receiver for receiving the protected session key and a protected second random value from the second device; and a computer arrangement for calculating the session key from the protected session key received from the second device using the password of the first device and the protected second random value received from the second device.

12. A second device for generating an authenticating message adapted to be supplied to a first device to enable the first device to confirm that a message from the second device must have been derived using a password of the first device, the first device being arranged for sending to the second device: (a) a protected version of the password and (b) a first random value, the second device being arranged for receiving (a) and (b) from the first device, the second device being arranged for protecting a session key using (a) and (b) as received from the first device, the second device being arranged for sending the protected session key to the first device, the first device being arranged for recovering the session key from the protected session key received from the second device by using the password of the first device, the second device comprising:

a receiver for receiving from the first device (a) the protected version of the password and (b) the first random value;

a second random value source for generating a second random value;

a protecting mechanism for generating a protected version of the second random value;

a session key source for deriving the session key;

a calculating mechanism for calculating the protected session key using (a) the protected version of the password and (b) the first random value from the first device, the second random value, and the session key; and a transmitter for supplying the protected session key and protected second random value to the first device for authentication.

13. A computer system for authenticating a message by confirming that the message must have been derived using a password of the computer system, comprising:

a first processor for receiving and transmitting data;

a communication interface for exchanging signals between the first processor and a first device, the first device including a first memory and a second processor for executing instructions; and a second memory coupled to said first processor; the second memory having stored therein sequences of instructions which, when executed by said first processor, cause said first processor to authenticate a message from the first device by causing said first processor to execute instructions for:

protecting a password of the first device;

generating a first random value for the first device;

transmitting the protected password and the first random value to the first device using the communication interface;

receiving a protected session key and a protected second random value from the first device using the communication interface; and calculating a session key from the protected session key received from the first device using the password of the computer system and the protected second random value received from the first device.

14. A computer system for generating an authenticating message to confirm that the message must have been derived using a password that is not known to the computer system, comprising:

a first processor for receiving and transmitting data;

a communication interface for exchanging signals between the first processor and a first device, the first device including a first memory and a second processor for executing instructions; and a second memory coupled to said first processor; the second memory having stored therein sequences of instructions which, when executed by said first processor, cause said first processor to authenticate a message from the first device by causing said first processor to execute instructions for:

receiving (a) a protected version of the password and (b) a first random value from the first device using the communication interface;

generating a second random value;

protecting the second random value;

creating a session key;

calculating a protected version of the session key using (a) the protected version of the password, (b) the first random value, the second random value, and the session key; and transmitting the protected session key and protected second random value to the first device for authentication.

* * * * *